United States Patent Office 3,422,279
Patented Jan. 14, 1969

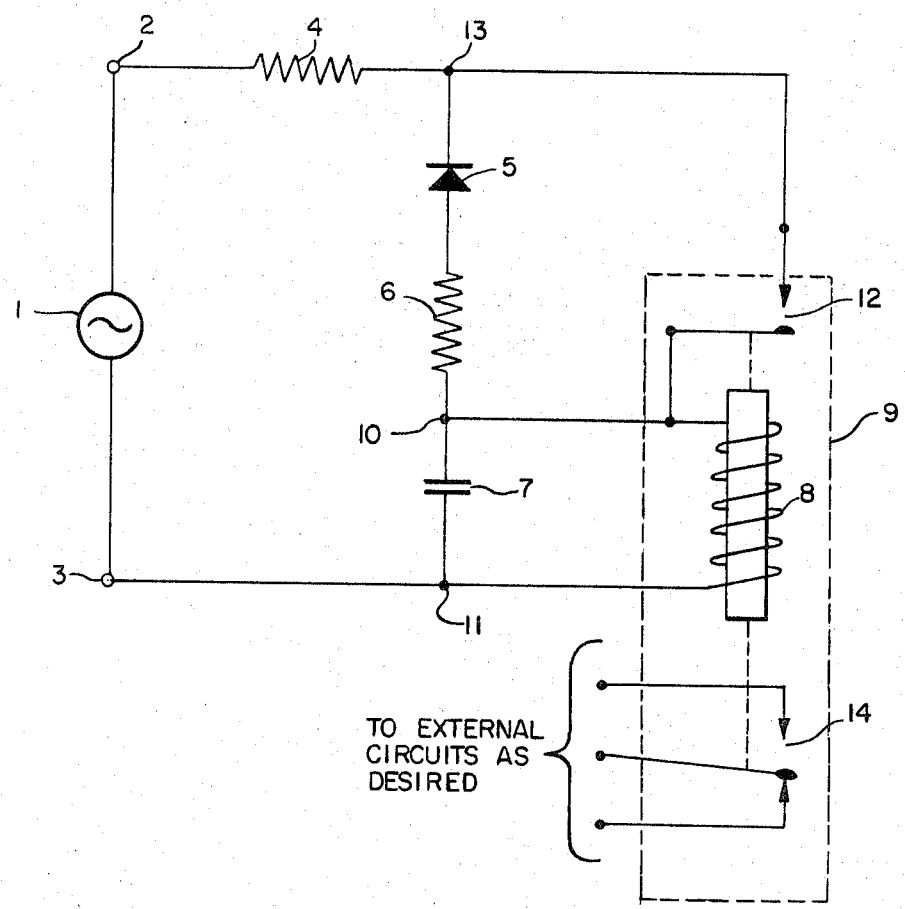

3,422,279
ELECTRICAL TIMING CIRCUIT
William G. Rowell, 18 Williams St.,
Canton, Mass. 02021
Filed Aug. 30, 1965, Ser. No. 483,470
U.S. Cl. 307—132          1 Claim
Int. Cl. H01h 47/00; 51/34

ABSTRACT OF THE DISCLOSURE

An electrical timing circuit for operating a relay through a repetitive switching sequence of predetermined duration. An alternating current power source remains connected across the circuit throughout the switching sequence.

---

This invention relates in general to timing switch circuits and more particularly concerns a relay circuit designed to produce repeated switching operations at a predetermined frequency.

In certain electrical testing, measuring, signalling, timing and controlling applications it is desired to produce recurrent pulses and/or provide cyclically operated switch means to control the operation, or influence the function of an electrical circuit. Examples of the many possible uses for such a device may be found in my U.S. Patents 2,798,213 and 2,798,214 where signals are periodically introduced into an electrical system to check its operation.

Many different types of apparatus are available to produce timed switching intervals, using devices such as solid state semiconductors, electron tubes, gas tubes, synchronous timers, and relays, each having their own characteristic limitations. Relay pulsing arrangements are widely used because of their circuit adaptability, reliability, mechanical ruggedness, ability to switch heavy loads, and contact isolation afforded.

While these relay circuits have performed satisfactorily, they are generally relatively complicated and expensive normally comprising at least two relays or their equivalent, and a substantial number of resistors, capacitors, and other components.

Accordingly, it is an object of this invention to provide a simplified yet reliable relay timing circuit.

Another object of this invention is to provide a means for periodically charging and discharging a timing capacitor without disconnecting the power source from the circuit.

The present invention operates by rectifying an A.C. signal to derive a pulsating D.C. signal, which charges a capacitor whose time constant, RC (resistance value multiplied by the capacitance value), is governed by suitable resistances. When a predetermined potential across the capacitor is reached, a relay whose control winding is connected in shunt across the capacitor pulls in or activates, operating suitable switches, causing the rectifier to be shorted out and the alternating signal source to be applied directly across the capacitor and relay control winding while the capacitor discharges through the control winding. The period of discharge lasts until the relay drops out or deactivates which period of time is governed by the resistance of the relay control winding. This switching action removes the short circuit from the rectifier and the switching operation recommences, operating cyclically and continuously while the alternating signal source remains applied to the circuit. Thus, a feature of the invention, due to the fact that the signal source remains connected to the circuit, is a lack of arcing at the contact points permitting long and continued use without need for replacement.

Other features, objects and advantages of this invention will become apparent from the following specification when read in connection with the accompanying drawing.

With reference now to the drawing, there is shown an A.C. power source 1, which for the purpose of this exposition is assumed to be the 60 cycle electrical power usually supplied for residential and industrial use in the United States, connected at points 2 and 3 across a half-wave rectifier circuit, which comprises a resistor 4, a diode 5, a second resistor 6, and a storage capacitor 7. The control winding 8 of relay 9 (shown by a dotted line) is connected at points 10 and 11 in shunt across capacitor 7. Control winding 8 presents a high impedance to A.C. and a high resistance to D.C. Relay 9 includes a pair of normally open contacts 12 which are connected to the rectifier circuit at points 10 and 13 so that diode 5 and resistor 6 are effectively shorted from the remainder of the circuit when contacts 12 are closed. At 14 is shown other relay contacts which may be connected to other circuits to be controlled.

In operation, the A.C. signal from source 1 is rectified by diode 5 to provide a pulsating D.C. which acts to build up a potential across capacitor 7 and control winding 8. The time constant of the charging circuit is large compared with one cycle of A.C. source 1 and for charging capacitor 7 it is RC, the value of resistances 4 and 6 multiplied by the value of capacitor 7. The time constant of a capacitor may be defined as the time required for the potential across the capacitor to build up to 63.2% of full charge after voltage is applied. When a predetermined potential across capacitor 7 and control winding 8 is reached, relay 9 activates or pulls in and closes contacts 12 and performs other desired switching operations at 14. When contacts 12 are closed, the A.C. signal is no longer rectified since diode 5 and resistor 6 are shorted from the circuit. At this time the unrectified A.C. signal is applied directly across capacitor 7 and control winding 8, while capacitor 7 discharges through control winding 8. The time constant of the discharge circuit, which is the value of the D.C. resistance of control winding 8 multiplied by the value of capacitor 7, is large compared with one cycle of A.C. source 1. This relatively large time constant combined with the high impedance which control winding 8 presents to A.C. allows the discharge of capacitor 7 through control winding 8 to continue relatively unaffected by the A.C. signal applied directly across the discharge circuit. When the potential across capacitor 7 has reached a predetermined value, relay 9 deactivates or drops out, contacts 12 are opened, other desired switching functions are performed at 14, the A.C. signal applied at points 2 and 3 is again rectified by diode 5 and the pulsating D.C. again acts to build up a potential across capacitor 7.

The frequency of operation of this timing device is governed by the values of resistances and capacitance in the charging and discharging circuit. Thus, it is obvious that the frequency may be changed by varying the values of resistors 4 and 6 or capacitor 7 or both. These components may be variable in order to provide a very flexible timing device. Further, the line voltage may be increased or decreased in any suitable manner to vary the timing cycle.

As an example of a timing apparatus according to the invention, utilization of the following specific values of the components shown in the drawing will cyclically provide approximately equal pull-in and drop-out times of about 1.5 seconds each.

Resistor 4 _____ 3,000 ohms, 2 watts fixed resistor.
Resistor 6 _____ 1,500 ohms, 2 watts fixed resistor.
Diode 5 _____ Rectifier.

Capacitor 7 _____ 150 volt, 150 microfarad capacitor.
Relay control winding 8 _____ 10,000 ohm plate circuit relay.
Power source 1 ____ 117 volt 60 cycle line.

From the above description, it is manifest that a relay timing device according to the above description fully satisfies the objects of the invention. It is also apparent that many variations of the invention may be made within the scope of the appended claims. For example, resistors 4 and 6 and capacitor 7 may be variable rather than fixed, as previously stated. Consequently, the invention is to be construed as limited only by the spirit and scope of the appended claim.

What is claimed is:

1. An electrical timing apparatus comprising: in electrical series combination a resistor-capacitor timing circuit and a rectifier circuit, means for applying an alternating voltage across said series combination, a relay having a control winding and a pair of normally open contacts, said relay control winding being connected electrically in shunt with said capacitor, said pair of contacts being connected electrically in shunt with said rectifier circuit; whereby upon application of said alternating voltage said rectifier circuit provides a pulsating D.C. to build up a potential across said capacitor, said relay being operative to close said pair of contacts when said potential across said capacitor and said relay control winding reaches a predetermined value, said contact pair, when closed, being effective to short circuit said rectifier circuit while said alternating voltage remains applied to said timing circuit, said relay control winding being effective to discharge said capacitor during the closure of said pair of contacts, whereupon said pair of contacts opens to remove said short circuit, said capacitor again charges with a direct potential as aforesaid, said switching operations recurring at a predetermined frequency while said alternating voltage remains applied to said series combination.

References Cited

UNITED STATES PATENTS

| | | | |
|---|---|---|---|
| 2,432,276 | 12/1947 | Boswau | 307—132 X |
| 2,895,082 | 7/1959 | Suyetani | 307—132 X |
| 3,082,357 | 3/1963 | Brauerman | 317—141 |

ROBERT K. SCHAEFER, *Primary Examiner.*

T. B. JOIKE, *Assistant Examiner.*

U.S. Cl. X.R.

317—141; 307—141